United States Patent
Heiman et al.

(10) Patent No.: US 8,687,744 B2
(45) Date of Patent: Apr. 1, 2014

(54) METHOD AND SYSTEM FOR AN IMPROVED CELLULAR DIVERSITY RECEIVER

(75) Inventors: Arie Heiman, Rannana (IL); Nelson Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 1194 days.

(21) Appl. No.: 11/518,695

(22) Filed: Sep. 11, 2006

(65) Prior Publication Data
US 2007/0165749 A1  Jul. 19, 2007

Related U.S. Application Data

(60) Provisional application No. 60/759,941, filed on Jan. 18, 2006.

(51) Int. Cl.
*H04L 27/06* (2006.01)
(52) U.S. Cl.
USPC ........... 375/341; 375/340; 375/343; 375/346; 375/347; 375/348; 375/349; 375/350; 455/63.1
(58) Field of Classification Search
USPC .......... 375/340, 341, 343, 346–350; 455/63.1
See application file for complete search history.

(56) References Cited

U.S. PATENT DOCUMENTS

| | | | | |
|---|---|---|---|---|
| 5,457,704 A * | 10/1995 | Hoeher et al. | | 714/794 |
| 6,519,740 B1 * | 2/2003 | Mårtensson et al. | | 714/822 |
| 6,694,474 B2 * | 2/2004 | Ramprashad et al. | | 714/755 |
| 6,819,630 B1 * | 11/2004 | Blackmon et al. | | 367/134 |
| 6,882,678 B2 * | 4/2005 | Kong et al. | | 375/144 |
| 6,950,975 B2 * | 9/2005 | Chang et al. | | 714/755 |
| 7,716,565 B2 * | 5/2010 | Heiman et al. | | 714/795 |
| 2001/0017904 A1 * | 8/2001 | Pukkila et al. | | 375/350 |
| 2004/0213360 A1 * | 10/2004 | McElwain | | 375/340 |
| 2005/0018794 A1 * | 1/2005 | Tang et al. | | 375/341 |
| 2005/0063378 A1 | 3/2005 | Kadous | | |
| 2005/0141430 A1 | 6/2005 | Borkowski | | |
| 2005/0141630 A1 * | 6/2005 | Catreux et al. | | 375/267 |

FOREIGN PATENT DOCUMENTS

| | | |
|---|---|---|
| EP | 1 471 655 A2 | 10/2004 |
| EP | 1 553 717 1 | 7/2005 |
| EP | 1 564 924 A1 | 8/2005 |
| WO | WO 99/21296 A1 | 4/1999 |

OTHER PUBLICATIONS

European Office Action directed to related European Application No. EP 06 022 152.0, mailed Mar. 5, 2013, European Patent Office, Munich, Germany; 4 pages.
Extended Search Report for European Application No. 06 02 2152.0, dated Jun. 8, 2012, 5 pages.

* cited by examiner

*Primary Examiner* — Shuwang Liu
*Assistant Examiner* — Sung Ahn
(74) *Attorney, Agent, or Firm* — Sterne, Kessler, Goldstein & Fox P.L.L.C.

(57) ABSTRACT

Aspects of a method and system for an improved cellular diversity receiver are described. Aspects of the system may include circuitry that enables generation of an initially decoded output bit sequence by a first frame process for a received bit sequence for a plurality of received multipath signals. The first frame process may utilize redundancy based decoding, which imposes at least one physical constraint during the decoding, which may be performed by a decoding algorithm.

30 Claims, 13 Drawing Sheets

METHOD AND SYSTEM FOR AN IMPROVED CELLULAR DIVERSITY RECEIVER

CROSS-REFERENCE TO RELATED APPLICATIONS/INCORPORATION BY REFERENCE

This patent application makes reference to, claims priority to and claims benefit from U.S. Provisional Patent Application Ser. No. 60/759,941 filed on Jan. 18, 2006.

The application makes reference to:
U.S. application Ser. No. 11/189,509 filed on Jul. 26, 2005; and
U.S. application Ser. No. 11/189.634 filed on Jul. 26, 2005.

Each of the above stated applications is hereby incorporated herein by reference in its entirety.

FIELD OF THE INVENTION

Certain embodiments of the invention relate to receivers utilized in wired and wireless communication systems. More specifically, certain embodiments of the invention relate to a method and system for an improved cellular diversity receiver.

BACKGROUND OF THE INVENTION

In some conventional receivers, improvements may require extensive system modifications that may be very costly and, in some cases, may even be impractical. Determining the right approach to achieve design improvements may depend on the optimization of a receiver system to a particular modulation type and/or to the various kinds of noises that may be introduced by a transmission channel. For example, the optimization of a receiver system may be based on whether the signals being received, generally in the form of successive symbols or information bits, are interdependent. Signals received from, for example, a convolutional encoder, may be interdependent signals, that is, signals with memory. In this regard, a convolutional encoder may generate non-return to zero inverted (NRZI) or continuous-phase modulation (CPM), which is generally based on a finite state machine operation.

One method or algorithm for signal detection in a receiver system that decodes convolutional encoded data is maximum-likelihood sequence detection or estimation (MLSE). The MLSE is an algorithm that performs soft decisions while searching for a sequence that minimizes a distance metric in a trellis that characterizes the memory or interdependence of the transmitted signal. In this regard, an operation based on the Viterbi algorithm may be utilized to reduce the number of sequences in the trellis search when new signals are received.

Another method or algorithm for signal detection of convolutional encoded data that makes symbol-by-symbol decisions is maximum a posteriori probability (MAP). The optimization of the MAP algorithm is based on minimizing the probability of a symbol error. In many instances, the MAP algorithm may be difficult to implement because of its computational complexity.

Improvements in the design and implementation of optimized receivers for decoding convolutional encoded data may require modifications to the application of the MLSE algorithm, the Viterbi algorithm, and/or the MAP algorithm in accordance with the modulation method utilized in signal transmission.

On factor that may lead to an uplink path being noise limited is limited transmitter power available at a mobile terminal. The limited transmitter power may limit the total signal energy transmitted by the mobile terminal. Transmitter power may be limited at a mobile terminal due to limitations in size for one or more batteries utilized in the mobile terminal, or due to regulatory limitations in maximum transmitter power imposed for safety reasons, for example.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for an improved cellular diversity receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention provide a method and system for an improved cellular diversity receiver. The cellular diversity receiver may combine signal energy from at least a portion of a plurality of signals x[1], x[2], ..., x[K] in a multipath cluster. The reception of at least two of the plurality of signals x[1], x[2], ..., x[K] may be referred to as receiver diversity. The cellular diversity receiver may detect data contained in a signal generated by the combining signal energies based on a multilayer decoding process. The multilayer decoding process may comprise a burst process and a frame process. Results from a first burst process may be utilized to generate a decoded bit sequence in the frame process. The frame process may utilize redundancy information and physical constraints to improve the performance of a decoding algorithm. In some voice applications, the decoding algorithm may utilize, for example, a Viterbi algorithm. Results from the frame process may be fed back for a second iteration of the burst process and the frame process, to further improve the decoding operation. In some instances, the second iteration of the burst process may be based on a gradient search approach.

Various embodiments of the invention may utilize any of a plurality of techniques for combining signal energy from at least a portion of the plurality of signals x[1], x[2], ..., x[K]. Exemplary techniques may comprise maximal ratio combining (MRC), and equal gain combining (EGC). Some conventional systems which employ receive diversity may combine signal energy from two of the plurality of signals x[1], x[2], ..., x[K]. In various embodiments of the invention, a base station may be utilized to combine signal energy from greater than two of the plurality of signals x[1], x[2], ..., x[K].

Figure 1:
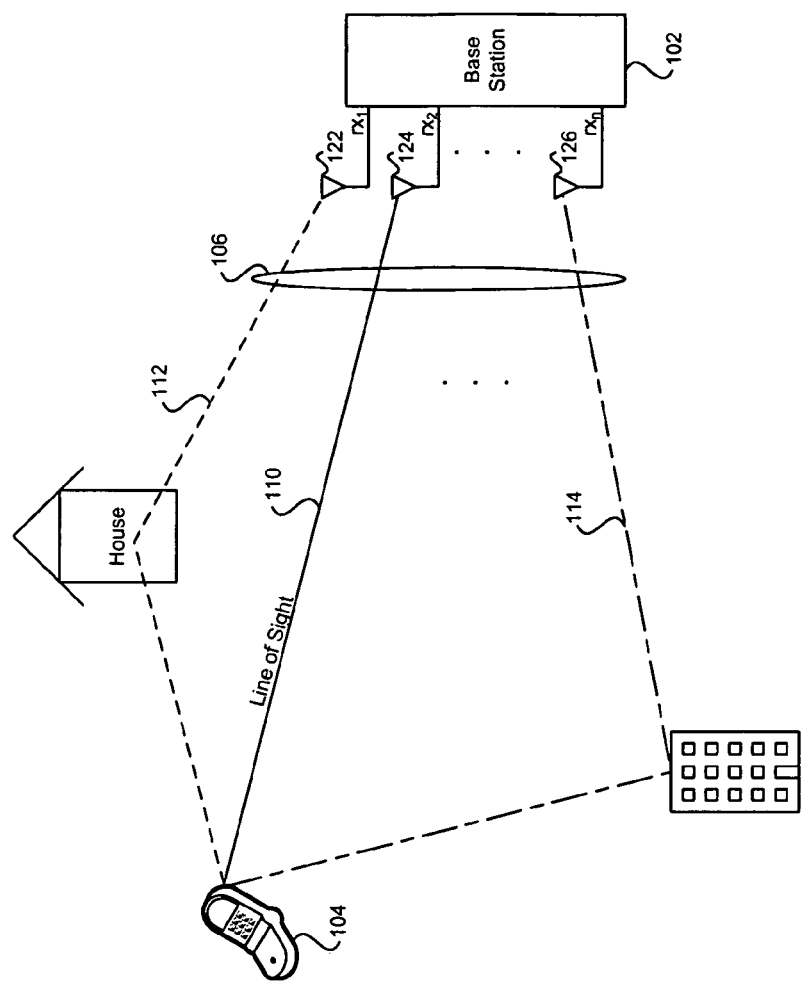
FIG. 1 is a diagram illustrating exemplary reception of a multipath cluster at a base station in a system for an improved cellular diversity receiver, in accordance with an embodiment of the invention.

FIG. 1 is a diagram illustrating exemplary reception of a multipath cluster at a base station in a system for an improved cellular diversity receiver, in accordance with an embodiment of the invention. Referring to FIG. 1, there is shown a base station 102, a plurality of receiving antennas 122, 124, ..., 126, a mobile terminal 104, and a multipath cluster 106. The multipath cluster 106 may comprise a plurality of individual path signals 110, 112, ..., 114. The individual path signals 110, 112, ..., 114 may travel via a wireless communication medium between the mobile terminal 104 and the base station 102. One of the individual path signals 110 may represent a direct line of sight route between the mobile terminal 104 and the base station 102, other individual path signals may represent routes wherein the signal is reflected from one or more objects in the uplink path between the mobile terminal 104 and the base station 102. For example, the individual path signal 112 may follow a route through which the signal is reflected by a house, while the individual path signal 114 may follow a route through which the signal is reflected by a building. The receiving antenna 122 may be utilized to receive the individual path signal 112. The receiving antenna 124 may be utilized to receive the individual path signal 110. The receiving antenna 126 may be utilized to receive the individual path signal 114.

The mobile terminal 104 may transmit a signal x, at a given time instant, comprising a given total signal energy. The signal x may be scattered to generate a plurality of individual path signals 110, 112, ..., 114. Each of the individual path signals 110, 112, ..., 114, may comprise a portion of the total signal energy such that the sum of the signal energies for the plurality of individual path signals may equal the total signal energy for the signal x. The plurality of individual path signals 110, 112, ..., 114 may be represented as a plurality of K individual path signals x[1], x[2], ..., x[K].

The base station 102 may receive a corresponding plurality of signals y[1], y[2], ..., y[K] where each signal y[i] may be represented as in the following equation:

$$y[i]=h[i]\cdot x[i]+n_c[i] \qquad \text{Equation [1]}$$

where i may represent an index with values that span a range from 1 to K, h[j] may represent one or more channel estimates associated with the wireless communication medium, and $n_c[i]$ may represent noise associated with the route taken by the $i^{th}$ individual path signal through the wireless communication medium. The SNR for the $i^{th}$ individual path signal, y[i] may be represented as in the following equation:

$$SNR[i] = \frac{h[i]\cdot x[i]}{n_c[i]} \qquad \text{Equation [2]}$$

In various embodiments of the invention, the base station 102 may combine at least a portion of the received signals to generate a combined signal y, as represented in the following equation:

$$y = \sum_{j=1}^{L} w_j \cdot H[j] \cdot x'[j] + \sum_{j=1}^{L} w_j \cdot n[j] \qquad \text{Equation [3]}$$

where $w_j$ may represent one of a plurality of weighting factors. The base station 102 may select a plurality of L signals from the plurality of individual path signals x[1], x[2], ..., x[K], where the value L is not greater than the value K, and apply a plurality of weighting factors $w_j$, to the selected plurality of individual path signals x'[1], x'[2], ..., x'[L]. In an exemplary EGC embodiment of the invention, each of the values $w_j$ may be equal. In an exemplary MRC embodiment of the invention, each of the values $w_j$ may be determined based a value associated with the corresponding received signal y[j].

In general, the base station 102 may utilize criteria to individually determine values for each of the weighting factors. In various embodiments of the invention, a value for any one of the weighting factors, $w_j$, may be nonzero, or equal to zero based on the criteria. For example, an exemplary criteria may utilize a threshold value for a selected individual path signal such that, for an individual path signal x'[j] whose energy level is less than the threshold value, the corresponding weighting factor $w_j$ may be equal to 0, wherein for an individual path signal x'[j] whose energy level is not less than the threshold value, the corresponding weighting factor $w_j$ may be nonzero.

When each of the plurality noise components n[1], n[2], ..., n[L] comprise additive Gaussian white noise (AWGN), for example, the weighted individual components n[j], represented in the second term in Equation [3], may be combined noncoherently. Consequently, the total value of the second term in Equation [3] may be less than the value of at least one of the plurality of the individual noise components n[1], n[2], ..., n[L]. By contrast, the weighted individual path signals x'[j], represented in the first term in Equation [3], may be combined coherently. Consequently, the total value of the first term in Equation [3] may be greater than the value of each one of the plurality of selected individual path signals x'[1], x'[2], ..., x'[L].

As a result, the SNR associated with the combined signal, y, may be greater than the SNR associated with each of the individual path signals y[i] as represented in the following equation:

$$\frac{\sum_{j=1}^{L} w_j \cdot H[j] \cdot x'[j]}{\sum_{j=1}^{L} w_j \cdot n[j]} > \frac{H[i] \cdot x[i]}{n[i]} \qquad \text{Equation [4]}$$

where the left hand term in Equation [4] may represent the SNR associated with the combined signal, y, and the right hand term in Equation [4] may represent the SNR associated with an individual path signal y[i].

In various embodiments of the invention, receiver sensitivity at a base station 102 may be improved by combining signal energy for at least a portion of the plurality of individual path signals 110, 112, . . . , 114, in the multipath cluster 106, based on Equation [4].

Various embodiments of the invention may be utilized when there is channel fading in the wireless communication medium. In a channel fading environment, the combining of signal energy, as in Equation [3], may comprise suitable phase rotations of each of the plurality of individual path signals 110, 112, . . . , 114 to compensate for channel fading for the route taken by each signal between the mobile terminal 104 and the base station 102. The suitable phase rotations may be incorporated in the corresponding channel estimates H.

Various embodiments of the invention may be utilized in a Rayleigh fading environment, and/or in a Ricean fading environment.

Figure 2:
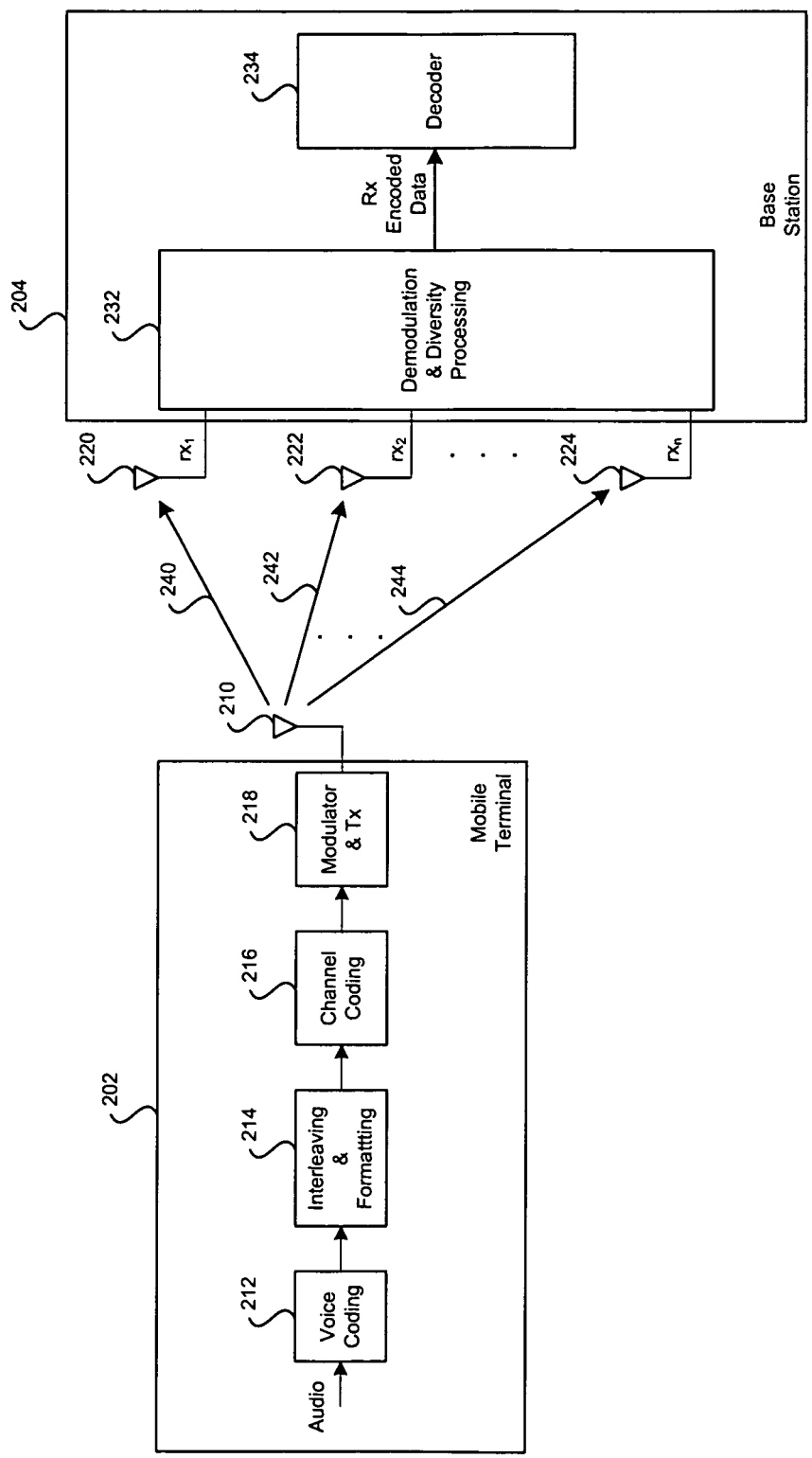
FIG. 2 is a block diagram illustrating exemplary functions performed by a mobile terminal and a base station in a system for an improved cellular diversity receiver, in accordance with an embodiment of the invention.

FIG. 2 is a block diagram illustrating exemplary functions performed by a mobile terminal and a base station in a system for an improved cellular diversity receiver, in accordance with an embodiment of the invention. Referring to FIG. 2, there is shown a mobile terminal 202, a transmitting antenna 210, a base station 204, a plurality of receiving antennas 220, 222, . . . , 224, and a plurality of individual path signals 240, 242, . . . , 244. The mobile terminal 202 may comprises a voice coding block 212, and interleaving and formatting block 214, a channel coding block 216, and a modulator and transmitter block 218. The base station 204 may comprise a demodulation and diversity processing block 232, and a decoder block 234.

The mobile terminal 202 may comprise suitable logic, circuitry and/or code that may enable receiving of information from an information source, for example speech from a user of the mobile terminal 202, encode the received information, modulate the encoded information utilizing a carrier frequency, and transmit a signal comprising the modulated encoded information, via a transmitting antenna 210, to a wireless communication medium. In an exemplary embodiment of the invention, the transmitted signal may be generated according to one or more communication standards, for example the Global System for Mobile Communications (GSM) and/or its derivatives, the integrated digital enhanced network (iDEN) and/or its derivatives, the interim standard 95 (IS-95) and/or its derivatives, the interim standard 136 (IS-136) and/or its derivatives, and/or personal digital cellular (PDC) and/or its derivatives. In exemplary embodiments of the invention, the transmitted signal may utilize a time division multiple access (TDMA) air interface, and/or a code division multiple access (CDMA) air interface, and/or wideband CDMA (WCDMA) air interface.

The voice coding block 212 may comprise suitable logic, circuitry and/or code that may enable receiving of audio information, for example speech, and generating a binary or other suitable representation of the received audio information. In an exemplary embodiment of the invention, the voice coding function 212 may perform adaptive multi-rate (AMR) coding according to technical specification (TS) 26.090 from the $3^{rd}$ Generation Project (3GPP).

The interleaving and formatting block 214 may comprise suitable logic, circuitry and/or code that may enable generation of an information frame based on received binary data. When the information frame is generated, bits in the received binary data may be arranged and grouped in an order based upon a coding method utilized for generating the binary data. In an exemplary embodiment of the invention, the received binary data may be arranged and grouped according to TS 26.101 from the 3GPP. The interleaving and formatting block 214 may also rearrange the order of bits within the information frame. The rearranged bit order may be output as interleaved binary data.

The channel coding block 216 may comprise suitable logic, circuitry and/or code that may enable generation of one or more symbols based on received binary data. The symbols may be generated based on a modulation type and a corresponding constellation map. Based on the modulation type, bits in the received binary data may be grouped, so that each group of bits may be utilized to select a symbol from the corresponding constellation map. The plurality of bits contained in the received binary data may be utilized to generate a corresponding plurality of symbols, where the symbols may comprise a representation of the plurality of bits. The plurality of symbols may be utilized to generate a baseband signal.

The modulator and transmitter block 218 may comprise suitable logic, circuitry and/or code that may enable reception of a baseband signal and generation of a corresponding transmitted signal. The modulator and transmitter block 218 may enable generation of a carrier signal where the frequency of the carrier signal may be referred to as a carrier frequency. The carrier frequency may be selected according to relevant industry standards and/or regulations. The carrier frequency may be utilized to modulate the baseband signal to generate the transmitted signal.

The base station 204 may comprise suitable logic, circuitry and/or code that may be utilized to receive a plurality of individual path signals from a wireless communication medium and performing diversity processing and decoding on the received signals. The diversity processing may comprise demodulating each of the received individual path signals utilizing a demodulating frequency, and combining at least a portion of the demodulated signals to generate a combined signal. Decoding may comprise decoding the combined signal to generate decoded information.

The demodulation and diversity processing block 232 may comprise suitable logic, circuitry and/or code that may enable generation of a combined signal by combining signal energy from a plurality of individual path signals, as illustrated in Equation [3]. The demodulation and diversity processing block 232 may enable generation of a demodulating signal. The demodulating signal may be utilized to demodulate the each of the received individual path signals to generate a combined signal. The demodulated signals, and the combined signal may be baseband signals.

The decoder block 234 may comprise suitable logic, circuitry and/or code that may enable decoding of the combined signal by performing burst processing and/or frame processing. The decoder block 234 may enable generation of decoded information.

In operation, the mobile terminal 202 may receive audio information as input. The voice coding block 212 may generate output data based on AMR coding of the audio input. The interleaving and formatting block 214 may generate a formatted information frame based on output received from the voice coding block 212. The interleaving and formatting block 214 may generate interleaved output data by interleaving bits in the formatted information frame. The channel coding block 216 may receive interleaved output data from the interleaving and formatting block 214 and generate a baseband signal comprising a plurality of symbols generated based on the received interleaved output data, and on a modulation type. The modulator and transmitter block 218 may generate a transmitted signal based on the baseband signal and utilizing a selected carrier frequency. The transmitted signal may be transmitted to the wireless communication medium via the transmitting antenna 210. The transmitted signal may comprise a plurality of individual path signals 240, 242, . . . , 244.

The base station 204 may receive at least a portion of the plurality of individual path signals 240, 242, . . . , 244 via a plurality of receiving antennas 220, 222, . . . , 224. The receiving antenna 220 may be utilized to receive individual path signal 240. The receiving antenna 222 may be utilized to receive individual path signal 242. The receiving antenna 224 may be utilized to receive individual path signal 244. The demodulation and diversity processing block 232 may demodulate each of the individual path signals received via receiving antennas 220, 222, . . . , 224 to generate corresponding demodulated signals. The received individual path signals may be demodulated based on a demodulating signal, where the frequency of the demodulating signal may be about equal to the selected carrier signal utilized at the mobile terminal 202, and associated with one or more individual path signals received via the wireless communication medium. The demodulation and diversity processing block 232 may also combine signal energy from the demodulated signals to generate a combined signal. The demodulation and diversity processing block 232 may output a baseband signal. The decoder 234 may perform burst processing and/or frame processing on the combined signal to generate decoded information.

In an exemplary embodiment of the invention, at least a portion of the decoded information may be utilized for establishing constraints, which may be utilized by the decoder block 234 for decoding the combined signal in connection with the burst process and/or frame process. When AMR coding is utilized, the constraints may be based on received and/or expected AMR parameters contained in at least a portion of the decoded information, for example line spectral pair (LSP) sets, pitch delay, and/or pitch gain. In this regard, the information content of at least a portion of the decoded information may be utilized for generating decoded information from the combined signal.

In various embodiments of the invention, burst processing and/or frame processing may further enable the base station to correct bit errors in a received signal to reduce BER and/or PER in received signals beyond the capabilities of some conventional decoding methods, for example Viterbi decoding. The effect of the BER and/or PER improvement may be equivalent to an increase in an SNR associated with a received signal and/or a combined signal beyond the SNR measures as illustrated in Equations [2] and/or [4].

Burst processing may comprise decoding groups of encoded bits contained within a frame by applying a forward error correction (FEC) technique. The encoded bits may be generated at a transmitter based on an inner code, for example a binary convolutional code (BCC). Burst processing may comprise decoding the encoded bits based on a technique such as Viterbi decoding. Burst processing may detect and/or correct bit errors within a group of encoded bits in a received frame based on examination of the group of encoded bits. Frame processing may comprise verifying and/or correcting bit errors that may have occurred during burst processing. Frame processing may utilize an outer code, in which an entire frame is examined to detect and/or correct bit errors within the frame. Frame processing may utilize a cyclical redundancy check (CRC) method, for example.

Figure 3:
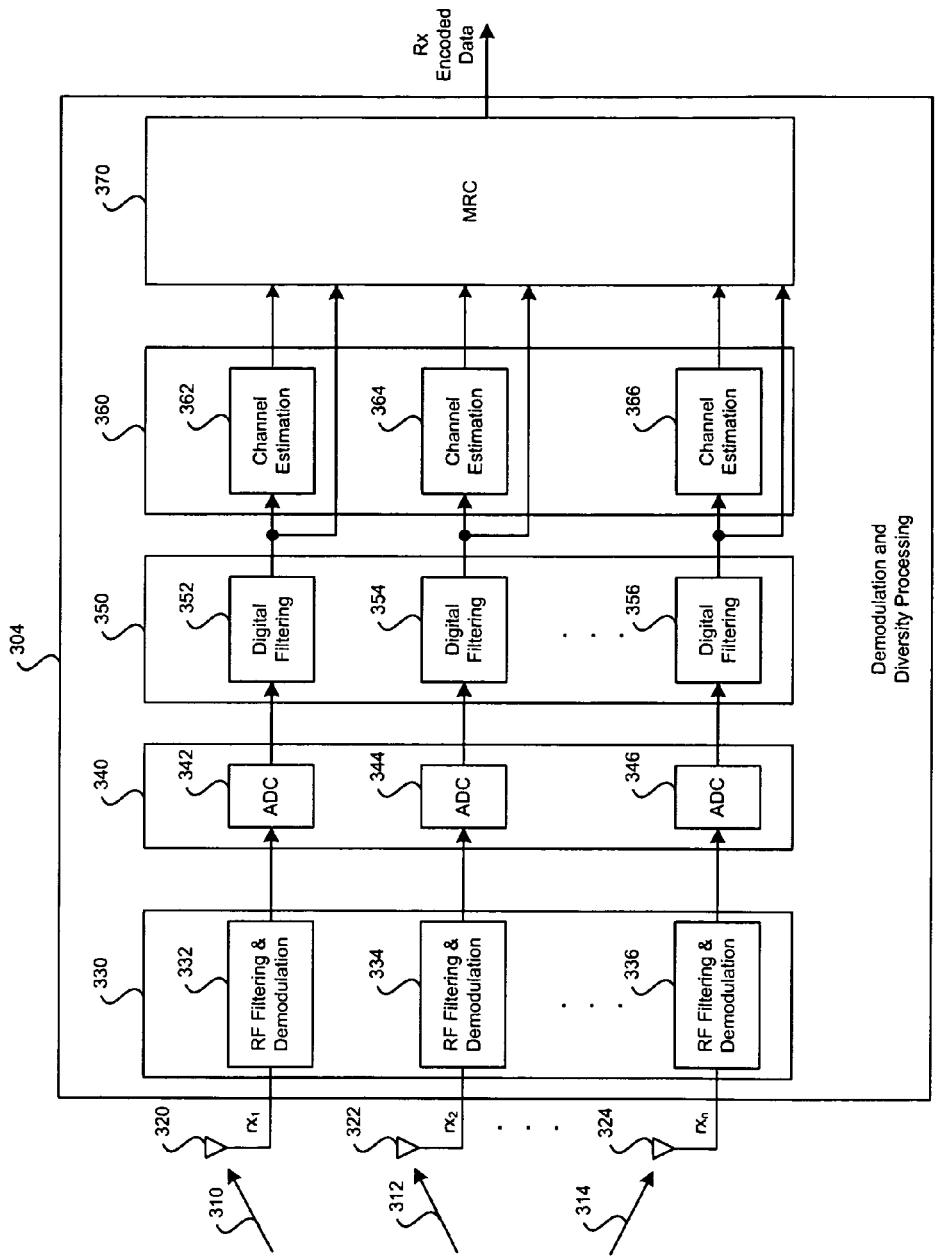
FIG. 3 is a block diagram illustrating exemplary demodulation and diversity processing functions performed by a base station in a system for an improved cellular diversity receiver, in accordance with an embodiment of the invention.

FIG. 3 is a block diagram illustrating exemplary demodulation and diversity processing functions performed by a base station in a system for an improved cellular diversity receiver, in accordance with an embodiment of the invention. Referring to FIG. 3, there is shown a demodulation and diversity processing block 304, a plurality of receiving antennas 320, 322, . . . , 324, and a plurality of individual path signals 310, 312, . . . , 314. The demodulation and diversity processing block 304 may comprise a radio frequency (RF) filtering and demodulation block 330, an analog to digital conversion (ADC) block 340, a digital filtering block 350, a channel estimation block 360, and a maximal ratio combining (MRC) block 370. The demodulation and diversity processing block 304 may comprise functionality that may be substantially similar to the demodulation and diversity processing block 232 (FIG. 2).

The RF filtering and demodulation block 330 may comprise a plurality of RF filtering and demodulation modules 332, 334, . . . , 336. The ADC block 340 may comprise a plurality of ADC modules 342, 344, . . . , 346. The digital filtering block 350 may comprise a plurality of digital filtering modules 352, 354, . . . , 356. The channel estimation block 360 may comprise a plurality of channel estimation modules 362, 364, . . . , 366.

The demodulation and diversity processing block 304 may comprise suitable logic, circuitry and/or code that may enable reception of a plurality of individual path signals from a wireless communication medium and performing diversity processing on the received signals. The diversity processing may demodulate each of the received individual path signals to generate a corresponding plurality of demodulated signals. Each of the demodulated signals may be converted from an analog representation to a digital representation. Each of the digital signals, comprising the corresponding digital representation, may be processed by a digital filter to generate a filtered digital signal. Each filtered digital signal, associated with a corresponding x'[1] received individual path signal, may comprise information that may be utilized for computing a channel estimate, H[j], which may be utilized to characterize an uplink path. A combined signal may be generated based on the plurality of digital signals and corresponding channel estimates.

The RF filtering and demodulation block 330 may comprise suitable logic, circuitry and/or code that may be utilized to comprise functionality for demodulating a plurality of received individual path signals to generate a corresponding plurality of demodulated signals. Each of the demodulated signals may be RF filtered by an RF filtering stage to select a corresponding baseband signal from the demodulated signal. The RF filtering stage may comprise a low pass filter. The RF filtering and demodulation block 330 may output a plurality of baseband signals corresponding to the plurality of received individual path signals.

Each of the RF filtering and demodulation modulation modules 332, 334, . . . , 336 may comprise suitable logic, circuitry and/or code that may be utilized to comprise functionality substantially similar to the RF filtering and demodulation block 330. Each of the RF filtering and demodulation modules 332, 334, . . . , 336 may receive a single individual path signal and output a single baseband signal.

The ADC block 340 may comprise suitable logic, circuitry and/or code that may enable conversion of a plurality of baseband signals comprising analog signal representations to a corresponding plurality of digital signal representations. Each of the digital signal representations may comprise a plurality of symbols.

Each of the ADC modules 342, 344, . . . , 346 may comprise suitable logic, circuitry and/or code that may be substantially similar to the ADC block 340. Each of the ADC modules 342, 344, . . . , 346 may receive a single baseband signal comprising an analog signal representation and output a single digital signal representation.

The digital filtering block 350 may comprise suitable logic, circuitry and/or code that may enable digital filtering of a plurality of digital signal representations. The digital filtering may be utilized to enable removal of undesirable artifacts in digital signals, which may result from analog to digital conversion, for example. The digital filtering block 350 may output a plurality of filtered digital signals corresponding to the received plurality of digital signal representations.

Each of the digital filtering modules 352, 354, . . . , 356 may comprise suitable logic, circuitry and/or code that may be substantially similar to the digital filtering block 350. Each of the digital filtering modules 352, 354, . . . , 356 may receive a single digital signal representation and output a single filtered digital signal.

The channel estimation block 360 may comprise suitable logic, circuitry and/or code that may be utilized to comprise functionality for computing channel estimates corresponding to a received plurality of filtered digital signals. The channel estimates may be utilized to characterize a plurality of uplink paths corresponding to a received plurality of individual path signals. Each of the channel estimates may be utilized at a base station 204 for computing estimated values for the individual path signals transmitted by a mobile terminal 202. The estimated values may be utilized for detecting information contained in the received plurality of individual path signals during the decoding process. The channel estimation block 360 may output a plurality of channel estimates, H[j], corresponding to the received plurality of filtered digital signals, where each of the filtered signals may generated based on a corresponding received plurality of individual path signals, x'[j].

Each of the channel estimation modules 362, 364, . . . , 366 may comprise suitable logic, circuitry and/or code that may be substantially similar to the channel estimation block 360. Each of the channel estimation modules 362, 364, . . . , 366 may receive a single filtered digital signal and output a corresponding channel estimate.

The MRC block 370 may comprise suitable logic, circuitry and/or code that may enable combining of signal energy associated with each of a plurality of filtered digital signals to generate a combined signal.

In operation, the demodulation and diversity processing block 304 may receive at least a portion of the plurality of individual path signals 310, 312, . . . , 314 via a plurality of receiving antennas 320, 322, . . . , 324. The receiving antenna 320 may be utilized to receive individual path signal 310. The receiving antenna 322 may be utilized to receive individual path signal 312. The receiving antenna 324 may be utilized to receive individual path signal 314.

The RF filtering and demodulation module 332 may be utilized to perform RF filtering and demodulation functions on the received individual path signal 310. The RF filtering and demodulation module 332 may output a demodulated signal based on the received individual path signal 310. The RF filtering and demodulation module 334 may enable RF filtering and demodulation of the received individual path signal 312. The RF filtering and demodulation module 334 may output a demodulated signal based on the received individual path signal 312. The RF filtering and demodulation module 336 may be utilized to perform RF filtering and demodulation functions on the received individual path signal 314. The RF filtering and demodulation module 336 may output a demodulated signal based on the received individual path signal 314.

The ADC module 342 may be utilized to perform analog to digital conversion functions on the demodulated signal received from the RF filtering and demodulation module 332. The ADC module 342 may output a digital signal comprising a plurality of symbols based on the demodulated signal received from the RF filtering and demodulation module 332. The ADC module 344 may enable analog to digital conversion of the demodulated signal received from the RF filtering and demodulation module 334. The ADC module 344 may output a digital signal comprising a plurality of symbols based on the demodulated signal received from the RF filtering and demodulation module 334. The ADC module 346 may enable analog to digital conversion of the demodulated signal received from the RF filtering and demodulation module 336. The ADC module 346 may output a digital signal comprising a plurality of symbols based on the demodulated signal received from the RF filtering and demodulation module 336.

The digital filtering module 352 may enable digital filtering of the digital signal received from the ADC module 342. The digital filtering module 352 may output a filtered digital signal based on the digital signal received from the ADC module 342. The digital filtering module 354 may enable digital filtering of the digital signal received from the ADC module 344. The digital filtering module 354 may output a filtered digital signal based on the digital signal received from the ADC module 344. The digital filtering module 356 may be utilized to perform digital filtering functions on the digital signal received from the ADC module 346. The digital filtering module 356 may output a filtered digital signal based on the digital signal received from the ADC module 346.

The channel estimation module 362 may compute channel estimates based on the filtered digital signal received from the digital filtering module 352. The channel estimation module 362 may output computed channel estimates based on the filtered digital signal received from the digital filtering module 352. The channel estimation module 364 may be utilized to compute channel estimates based on the filtered digital signal received from the digital filtering module 354. The channel estimation module 364 may output computed channel estimates based on the filtered digital signal received from the digital filtering module 354. The channel estimation module 366 may be utilized to compute channel estimates based on the filtered digital signal received from the digital filtering module 356. The channel estimation module 366 may output computed channel estimates based on the filtered digital signal received from the digital filtering module 356.

The MRC block 370 may be utilized to generate a combined signal by combining signal energy associated a plurality of filtered digital signals from the digital filtering block 350, based on a corresponding plurality of channel estimates computed by the channel estimation block 350. The plurality of filtered digital signals received from the digital filtering block 350 may correspond to a received plurality of individual path signals x'[j] received at the RF filtering and demodulation block 330. The MRC block 270 may generate the combined signal by utilizing the plurality of filtered digital signals, the corresponding plurality of channel estimates H[j], computed by the channel estimation block 360, corresponding to each of the filtered digital signals, and a corresponding plurality of computed weighting factors $w_j$. The MRC block 370 may enable computation of the plurality of weighting factors $w_j$. The functionality performed within the MRC block 370 for generating a combined signal based on a plurality of received individual path signals may be as illustrated in Equation [3]. The MRC block 370 may output received (RX) encoded data.

Figure 4A:
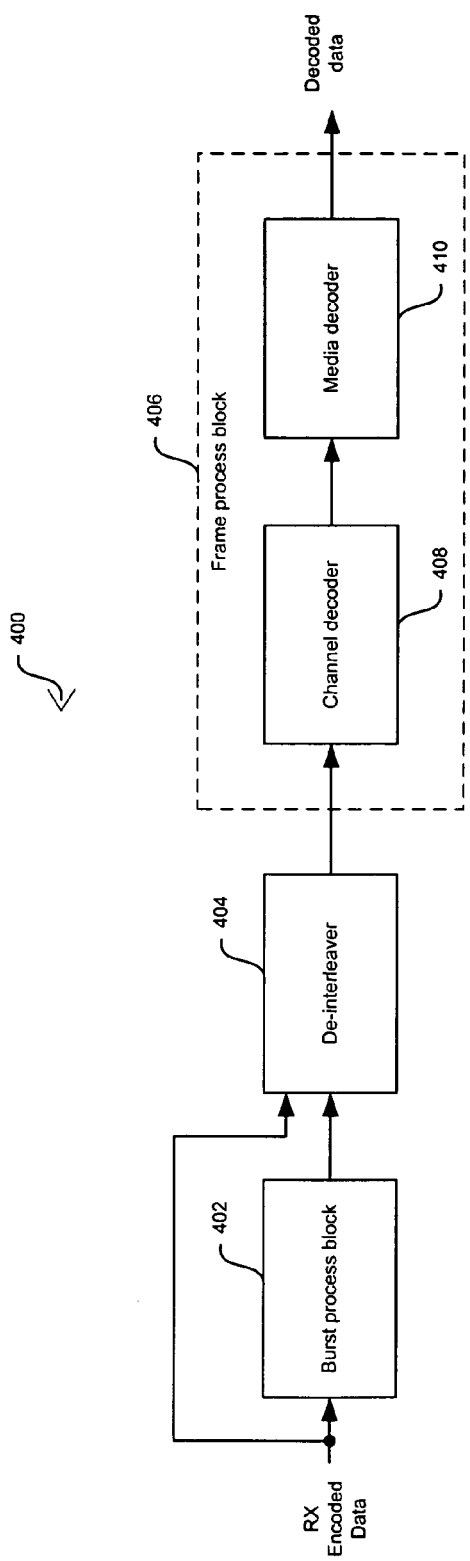
FIG. 4A is a block diagram illustrating a multilayer system for improving decoding, in accordance with an embodiment of the invention.

FIG. 4A is a block diagram illustrating a multilayer system for improving decoding, in accordance with an embodiment of the invention. Referring to FIG. 4A, there is shown a decoder 400 that comprises a burst process block 402, a de-interleaver 404, and a frame process block 406. The decoder 400 may comprise the functionality of the decoder 234 (FIG. 2). The frame process block 406 may comprise a channel decoder 408 and a media decoder 410. The decoder 400 may comprise suitable logic, circuitry, and/or code that may be adapted to operate in a wired or wireless receiver. The decoder 400 may be adapted to utilize redundancy to decode RX encoded data, for example, signals that comprise convolutional encoded data. The decoder 400 may also be adapted to utilize a multilayer approach for improving the decoding of RX encoded data or signals with memory. In this regard, the decoder 400 may be adapted to perform a burst process and a frame process when processing the RX encoded data. The multilayer approach performed by the decoder 400 may be compatible with a plurality of modulation standards.

The burst process block 402 may comprise suitable logic, circuitry, and/or code that may be adapted to perform the burst process portion of the decoding operation of the decoder 400. The burst process block 402 may comprise, for example, a channel estimation operation and a channel equalization operation. Results from the channel estimation operation may be utilized by the channel equalization operation to generate a plurality of data bursts based on a maximum-likelihood sequence estimation (MLSE) operation. The output of the burst process block 402 may be transferred to the de-interleaver 404. The de-interleaver 404 may comprise suitable logic, circuitry, and/or code that may be adapted to multiplex bits from a plurality of data bursts received from the burst process block 402 to form the frame inputs to the frame process block 406. Interleaving may be utilized to reduce the effect of channel fading distortion, for example.

The channel decoder 408 may comprise suitable logic, circuitry, and/or code that may be adapted to decode the bit sequences in the input frames received from the de-interleaver 404. The channel decoder 408 may be adapted to utilize the Viterbi algorithm during a Viterbi operation to improve the decoding of the input frames. The media decoder 410 may comprise suitable logic, circuitry, and/or code that may be adapted to perform content specific processing operations on the results of the channel decoder 408 for specified applications such as MPEG-4, enhanced full-rate (EFR) or adaptive multi-rate (AMR) speech coder used in global system for mobile (GSM) communications, and/or MP3, for example.

Regarding the frame process operation of the decoder 400, a standard approach for decoding convolution encoded data is to find the maximum-likelihood sequence estimate (MLSE) for a bit sequence. This may involve searching for a sequence X in which the conditional probability P(X/R) is a maximum, where X is the transmitted sequence and R is the received sequence, by using, for example, the Viterbi algorithm. In some instances, the received signal R may comprise an inherent redundancy as a result of the encoding process by the signals source. This inherent redundancy may be utilized in the decoding process by developing a MLSE algorithm that may be adapted to meet at least some of the physical constrains of the signals source. The use of physical constraints in the MLSE may be expressed as finding a maximum of the conditional probability P(X/R), where the sequence X meets a set of physical constrains C(X) and the set of physical constrains C(x) may depend on the source type and on the application. In this regard, the source type may be a voice, music and/or a video source type.

For example, for speech applications, physical constraints may include gain continuity and smoothness in inter-frames or intra-frames, pitch continuity in voice inter-frames or intra-frames, and/or consistency of line spectral frequency (LSF) parameters that are utilized to represent a spectral envelope.

Various embodiments of the invention may be utilized when the decoding process comprises burst processing and/or frame processing. For example, when the base station 204 receives individual path signals via a WCDMA air interface, the decoder 400 may bypass the burst processing block 402 when decoding RX encoded data. In this case, the RX encoded data may be input directly to the de-interleaver block 404, which may communicate an output to the frame process block 406.

Figure 4B:
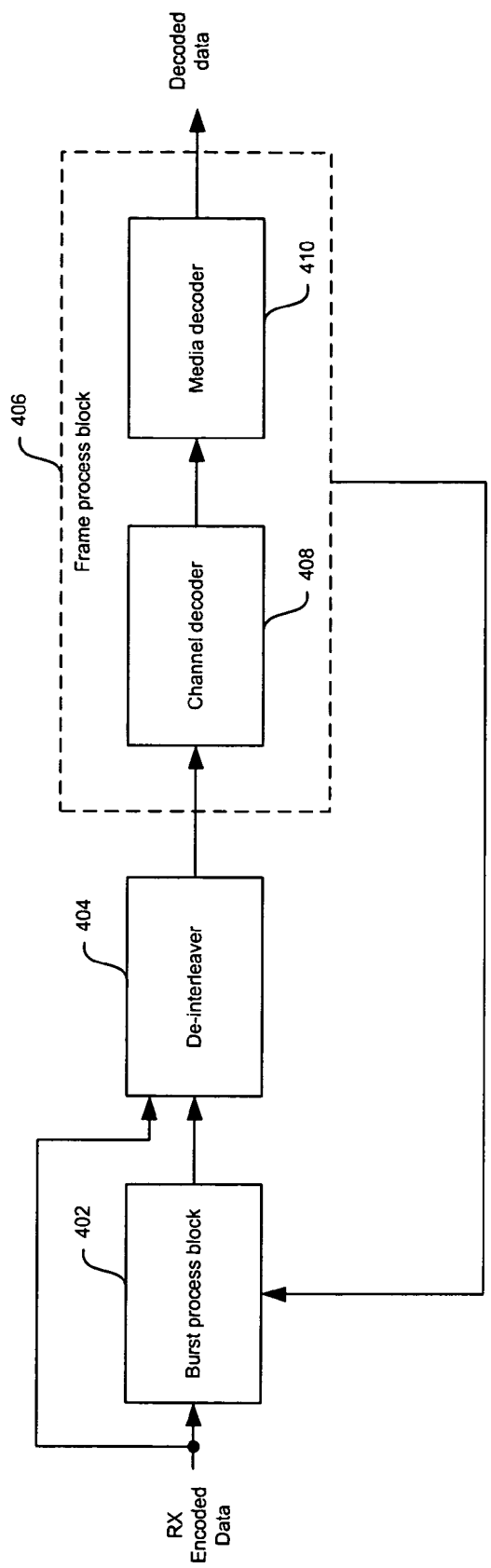
FIG. 4B is a block diagram illustrating an iterative multilayer approach for improving decoding, in accordance with an embodiment of the invention.

FIG. 4B is a block diagram illustrating an iterative multilayer approach for improving decoding, in accordance with an embodiment of the invention. Referring to FIG. 4B, there is shown the decoder 400 in FIG. 4A with a feedback signal from the frame process portion of the multilayer decoding approach to the burst process portion of the multilayer decoding approach. The frame process may comprise the use of redundancy verification of the results generated by the Viterbi algorithm and the use of physical constraints to reduce decoding errors that may result from the standard Viterbi algorithm. The burst process may utilize information decoded in the frame process as an input to improve the channel estimation and channel equalization operations.

Figure 5:
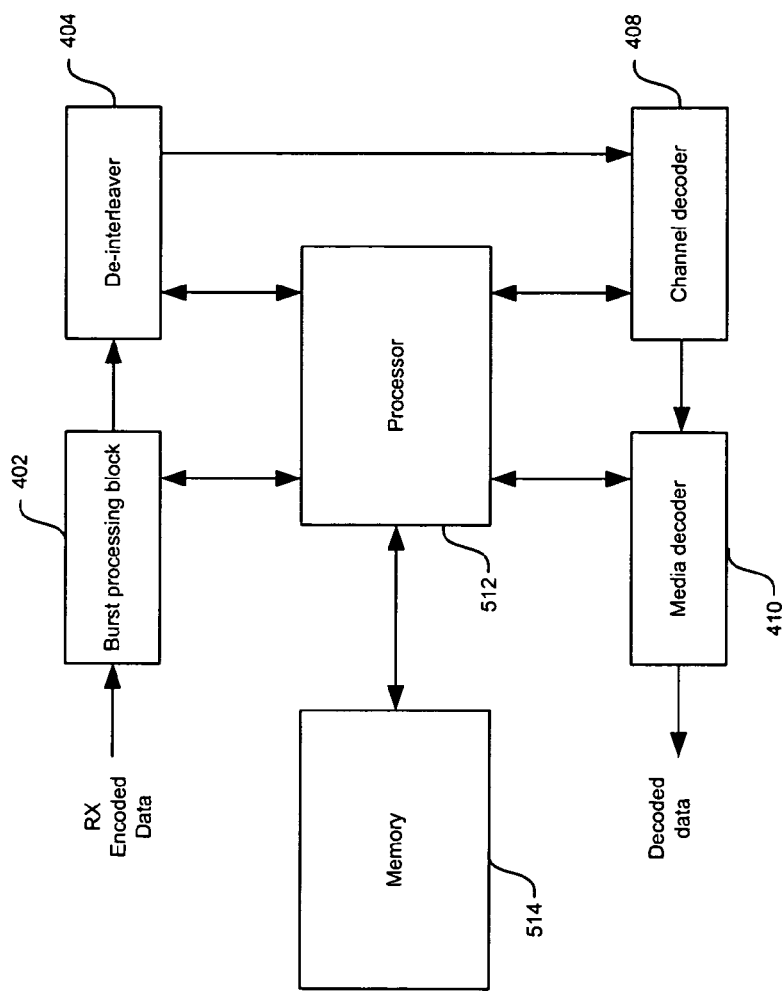
FIG. 5 is a block diagram illustrating a multilayer system with a processor and memory for improving decoding, in accordance with an embodiment of the invention.

FIG. 5 is a block diagram illustrating a multilayer system with a processor and memory for improving decoding, in accordance with an embodiment of the invention. Referring to FIG. 5, there is shown a processor 512, a memory 514, the burst process block 402, a de-interleaver 404, the channel decoder 408 and the media decoder 410. The processor 512 may comprise suitable logic, circuitry, and/or code that may be adapted to perform computations and/or management operations. The processor 512 may also be adapted to communicate and/or control at least a portion of the operations of the burst process block 402, the de-interleaver 404, the channel decoder 408 and the media decoder 410. The memory 514 may comprise suitable logic, circuitry, and/or code that may be adapted to store data and/or control information. The memory 514 may be adapted to store information that may be utilized and/or that may be generated by the burst process block 402, the de-interleaver 404, the channel decoder 408 and the media decoder 410. In this regard, information may be transferred to and from the memory 514 via the processor 512, for example.

Figure 6A:
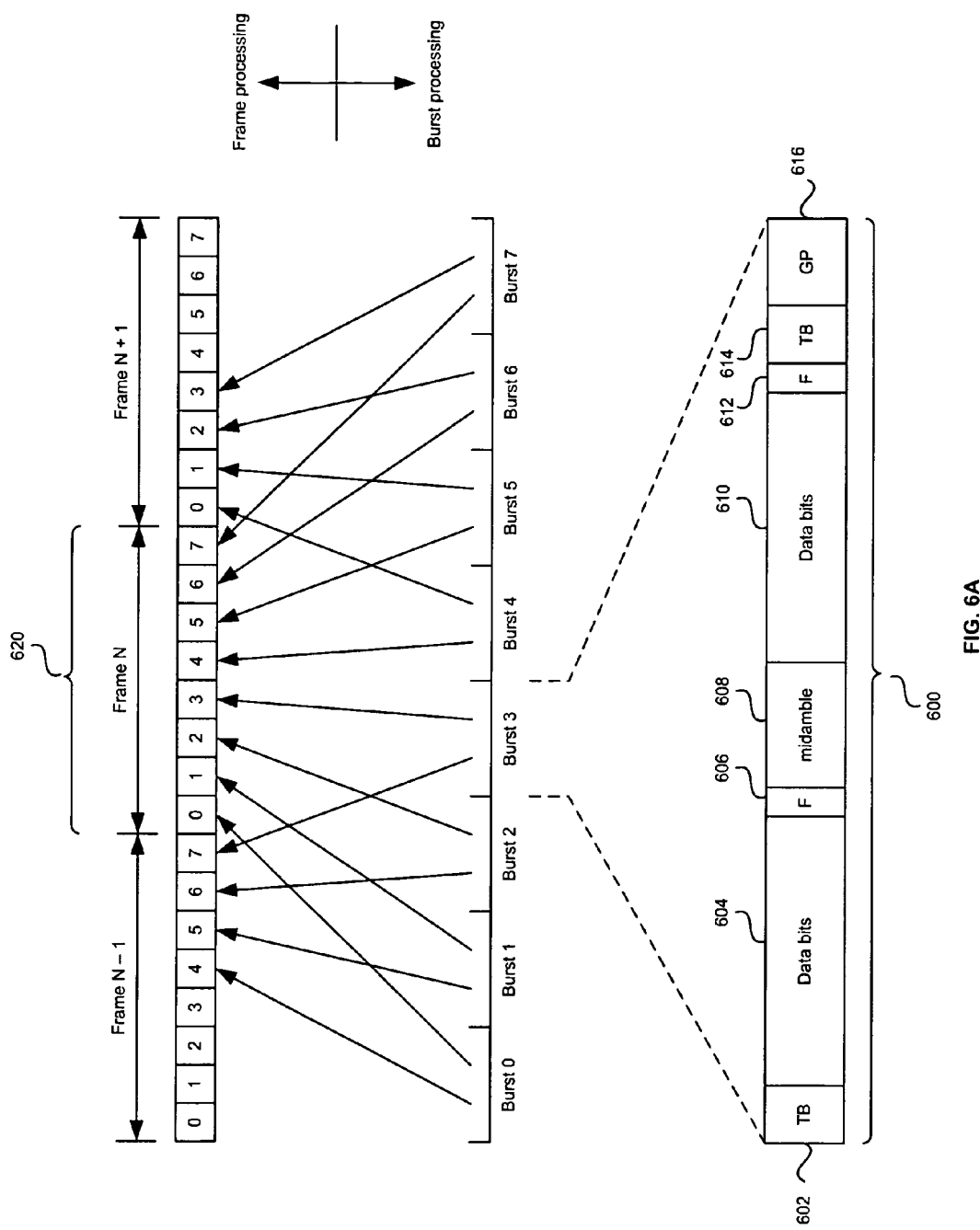
FIG. 6A is a diagram illustrating exemplary combined frame and burst processes in GSM applications, in accordance with an embodiment of the invention.

FIG. 6A is a diagram illustrating exemplary combined frame and burst processes in GSM applications, in accordance with an embodiment of the invention. Referring to FIG. 6A, there is shown a series of at least one time slot burst 600 and a series of at least one frame 620. The series of at least one time slot burst 600, as shown, may correspond to Burst 0 through Burst 7, while the series of at least one frame 620, as shown, may correspond to Frame N−1 through Frame N+1. The series of at least one time slot burst 600 may be generated during the burst processing of the decoder 400 in FIG. 4A, while the series of at least one frame 620 may be generated during the frame processing of the decoder 400. The time slot burst 600 may comprise a tail bit (TB) 602, first data bits 604, a flag bit (F) 606, a midamble 608, second data bits 610, a flag bit (F) 612, a tail bit (TB) 614, and guard bits (GP) 616. The TB 602 and the TB 614 may comprise 3 bits each. The first data bits 604 and the second data bits 610 may comprise 57 bits each. The F 606 and the F 612 flag bits may comprise 1 bit each. The midamble 608 may comprise 26 bits and may be utilized as a training sequence for channel equalization, for example. The frame 620 may comprise eight partitions or sequences of bits.

As shown, the first data bits 604 in the Burst 0 through Burst 3 may be transferred to the fifth, sixth, seventh, and eight sequences of the Frame N−1 respectively, for example. The first data bits 604 in the Burst 4 through Burst 7 may be transferred to the fifth, sixth, seventh, and eight sequences of the Frame N respectively, for example. The second data bits 610 in the Burst 0 through Burst 3 may be transferred to the first, second, third, and fourth sequences of the Frame N respectively, for example. The second data bits 610 in the Burst 4 through Burst 7 may be transferred to the first, second, third, and fourth sequences of the Frame N+1 respectively, for example. The decoding of bit sequences transferred from the time slot bursts in the burst processing to the frames in the frame processing may be performed by utilizing the Viterbi algorithm to reduce the number of sequences utilized during the decoding search. In this regard, utilizing signal redundancy and at least one physical constraint may result in a more accurate decoding operation.

Figure 6B:
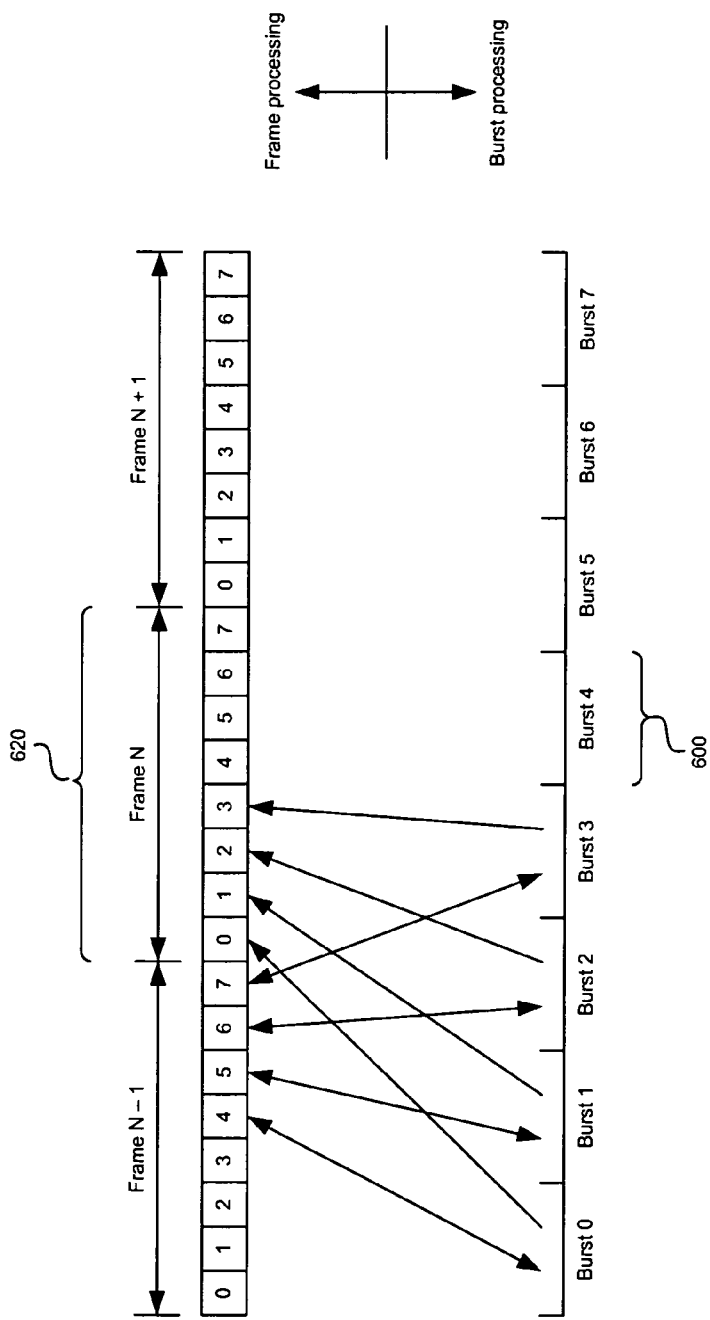
FIG. 6B is a diagram illustrating exemplary iterative frame and burst processes in GSM applications, in accordance with an embodiment of the invention.

FIG. 6B is a diagram illustrating exemplary iterative frame and burst processes in GSM applications, in accordance with an embodiment of the invention. Referring to FIG. 6B, there is shown a series of at least one time slot burst 600 and a series of at least one frame 620 as illustrated in FIG. 6A. The series of at least one time slot burst 600 may correspond to Burst 0 through Burst 7, while the series of at lest one frame 620 may correspond to Frame N−1 through Frame N+1.

There may be two types of iterative processes to consider: a causal iterative process and a non-causal iterative process. For the causal iterative process, Burst 0 through Burst 3 may each have 57 data bits from the first data bits 604 portion of the time slot burst 600 that have been decoded during the frame processing of Frame N−1. Utilizing the decoded 57 data bits in each of Burst 0 through Burst 3 and the 26 bits in the midamble 608, the burst process may be recalculated or a second iteration of the burst process may occur. In this regard, the channel estimation operation of the burst process may be improved by utilizing the decoded data bits generated by the frame process during a second iteration. Moreover, the MLSE in the channel equalization operation of the burst process may consider that the decoded data bits are known with a higher probability than during the first iteration. In some instances, to reduce the complexity that may be introduced by a second iteration operation, the burst process may be adapted to perform a second iteration on selected time slot bursts determined during the first iteration. In this regard, a particular time slot burst may be selected for a second iteration when it is associated with having a low carrier-to-interference (C/I) value, for example. Once the burst process improves the data, it may be further interleaved and processed by the frame process. The frame process my use a standard frame process or determine the best sequence based on, for example, the redundancy For the non-causal iterative process, bits from Burst 0 through Burst 7 may be needed to recalculate the burst process for bit sequences that may be transferred to Frame N. Data from Frame N−1 and/or data from Frame N+1 may be utilized to calculate the burst process for bit sequences that may be transferred to Frame N. Utilizing the decoded 114 data bits in each of Burst 0 through Burst 7 and the 26 bits in the midamble 608, the burst process may be recalculated. As with the causal iterative process, a particular time slot burst may be selected for a second iteration when it is associated with having a low carrier-to-interference (C/I) value, for example.

Figure 7:
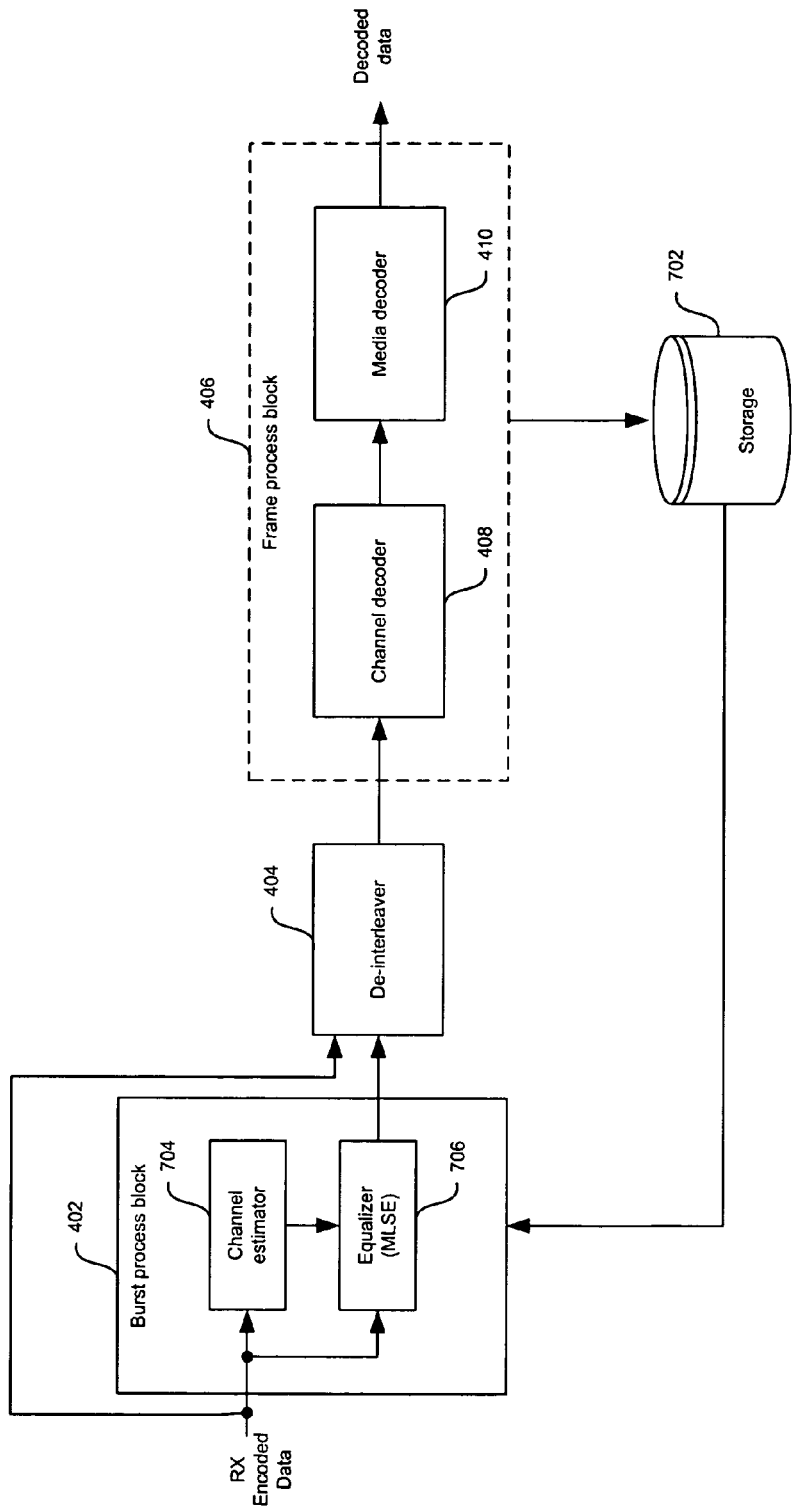
FIG. 7 is a block diagram illustrating exemplary non-causal iterative system, in accordance with an embodiment of the invention.

FIG. 7 is a block diagram illustrating an exemplary non-causal iterative system, in accordance with an embodiment of the invention. Referring to FIG. 7, there is shown the burst process block 402, the de-interleaver 404, the frame process block 406, the channel decoder 408, the media decoder 410, and storage 702. The burst process block 402 is shown to comprise a channel estimator 704 and an equalizer 706. The storage 702 may comprise suitable logic, circuitry, and/or code that may be adapted to store data associated with the frame process of a previously processed frame. The channel estimator 704 may comprise suitable logic, circuitry, and/or code that may be adapted to perform channel estimation operations during the burst process. The equalizer 706 may comprise suitable logic, circuitry, and/or code that may be adapted to perform MLSE channel equalization operations during the burst process.

In operation, data stored in the storage 702 that resulted from a frame process operation may be transferred to the channel estimator 704 and/or the equalizer 706 for a second iteration of the burst process for the Frame N. In this regard, the data stored in the storage 702 may comprise information regarding the time slot bursts in the burst process that may be utilized during the second iteration of the burst process for the Frame N.

When using the 57 data bits and the 26 midamble bits in the causal iterative process or when using 114 data bits and the 26 midamble data bits in the non-causal iterative process, hard decision values or soft decision values for the data bits may be utilized during the second iteration of the burst process. In some instances, soft decision values may be preferred for a particular application.

The channel estimator 704 in FIG. 7 may be adapted to perform a soft decision for the burst process. For example, for Gaussian minimum shift keying (GMSK) modulation, the estimated channel may be given by the expression:

$$\hat{W}(m) = \frac{1}{\text{Gain}} \cdot \sum_{n=0}^{N} j^n \cdot x_n \cdot S(m+n)$$

where $\hat{A}_n = j^n \cdot \overline{A}_n$ and $\overline{A}_n = \pm 1$, and the soft reference is given by $x_n = \alpha_n \cdot \overline{A}_n$, where $\alpha_n$ is a weight of the soft decision, and m=0, 1, 2, ... 7. In this regard, the gain for the estimated channel may be given by the expression:

$$\text{Gain} = \sum_{n=0}^{N} \frac{|x_n|}{(1-2 \cdot P_{ER}^n)}$$

where $N = 147$, and $$x_n = \begin{cases} \pm 1 & \text{If (Bit} \in \text{Midamble)} \\ 0.3625 \cdot SD_n/15 & \text{If (Bit} \in \text{Prev} - \text{Iteration)} \end{cases}$$

where $SD_n$ refers to a soft decision value. The gain for the estimated channel may be simplified to the expression:

$$\text{Gain} = \sum_{n=0}^{N} \frac{|x_n|}{(1-2 \cdot P_{ER}^n)} \approx 0.825 \cdot \sum_{n=0}^{147} |x_n|$$

The offset and the estimation may be determined by the expression $$E(\text{Offset}) = \sum_{k=0}^{4} |\hat{W}(k + \text{Offset})|^2$$

In instances when the equalizer 706 in FIG. 7 is not adapted to handle the results from a previous iteration, a gradient search approach may be utilized for the second iteration in the burst process. In this regard, the first iteration may be performed in hardware and at least a portion of the second iteration may be performed in software, for example.

Figure 8:
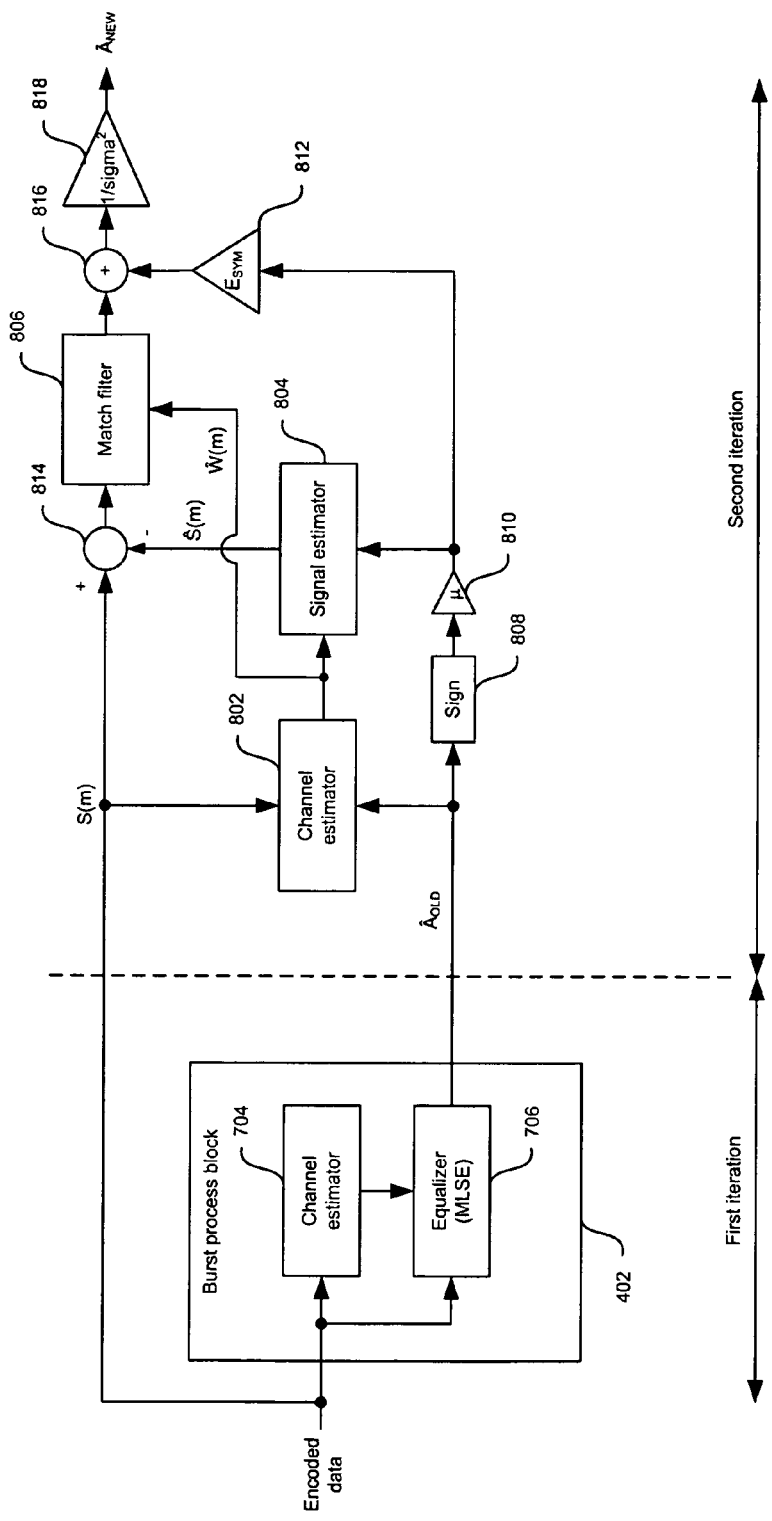
FIG. 8 is a block diagram illustrating exemplary implementation of a second burst process iteration based on a gradient search approach, in accordance with an embodiment of the invention.

FIG. 8 is a block diagram illustrating an exemplary implementation of a second burst process iteration based on a gradient search approach, in accordance with an embodiment of the invention. Referring to FIG. 8, the gradient search in the second iteration of the burst process may be implemented utilizing suitable logic, circuitry, and/or code and may comprise a channel estimator 802, a signal estimator 804, a match filter 806, a sign converter 808, a converger 810, an energy estimator 812, a first adder 814, a second adder 816, and a gain stage 818.

The gradient search approach is based on finding the minimal distance H between a received and an estimated signal. The minimal distance H may be given by the expression:

$$H = \int (S(t) - \hat{S}(t))^2 dt$$

where $$\hat{S}(t) = \sum_{k=0}^{K} \hat{A}_k \cdot \hat{W}(t - k \cdot T_{SYM})$$

$\hat{A}_k$ is the $k^{th}$ element of the estimated symbols vector, and $\hat{W}(t)$ is the estimated symbol waveform. The gradient may be given by the expression:

$$G = \frac{\partial H}{\partial \hat{A}}$$

and $$G_k(\hat{A}) = \int (conj(\hat{W}(t - k \cdot T_{SYM})) \cdot \left( S(t) - \sum_{m=-\infty}^{+\infty} \hat{A}_m \cdot \hat{W}(t - m \cdot T_{SYM}) \right)) \cdot dt$$

where $G_k$ is the $k^{th}$ element of gradient vector.

The signal estimator 1104 may comprise suitable logic, circuitry, and/or code that may be adapted to perform a signal estimation operation based on the following expression:

$$I(t) = SignalEstimation(\hat{A})$$
$$= \sum_{k=-\infty}^{+\infty} \hat{A}_k \cdot \hat{W}(t - k \cdot T_{SYM})$$

The match filter 1106 may comprise suitable logic, circuitry, and/or code that may be adapted to perform a match filtering operation based on the following expression:

$$G_k = \text{MatchFilter}(S(t) - I(t)) = \int (conj(\hat{W}(t - k \cdot T_{SYM})) \cdot (S(t) - I(t))) \cdot dt$$

The gradient expression may be written as:

$$G_k(\hat{A}) = \text{MatchFilter}(S(t) - \text{SignalEstimation}(\hat{A}))$$

Using the gradient expression, the value of $\hat{A}$ may be estimated by the following iteration equation:

$$\hat{A}_{NEW} = \mu \cdot E_{SYM} \cdot \hat{A}_{OLD} + G_k(\mu \cdot \hat{A}_{old})$$

where $\mu$ is a convergence coefficient that may be provided by the converger 810 and that may be given by the expression $$\mu = \frac{1}{IterNum}$$

where IterNum may correspond to the number of iterations, and $$E_{SYM} = \int |\hat{W}(t)|^2 \cdot dt$$

may correspond to the energy of the estimated channel $\hat{W}(t)$ provided by the energy estimator 812. The gain stage 818 may comprise suitable logic, circuitry, and/or code that may be adapted to generate a normalization of the output soft decision generated by the second adder 816 to additive noise power (sigma$^2$). In some instances, the noise power may equal to the mean square error of estimation:

$$E_{NOISE} = sigma^2$$
$$= \frac{1}{T_{BURST}} \cdot \int_{T_{BURST}} (S(t) - \hat{S}(t))^2 dt$$

The approach described herein may result in fewer decoding bit errors than may occur by a single iteration of the standard Viterbi algorithm. The use of an iterative multilayer process that utilizes redundancy and physical constraints may be efficiently implemented in the design of optimized receivers for decoding convolutional encoded data.

Figure 9:
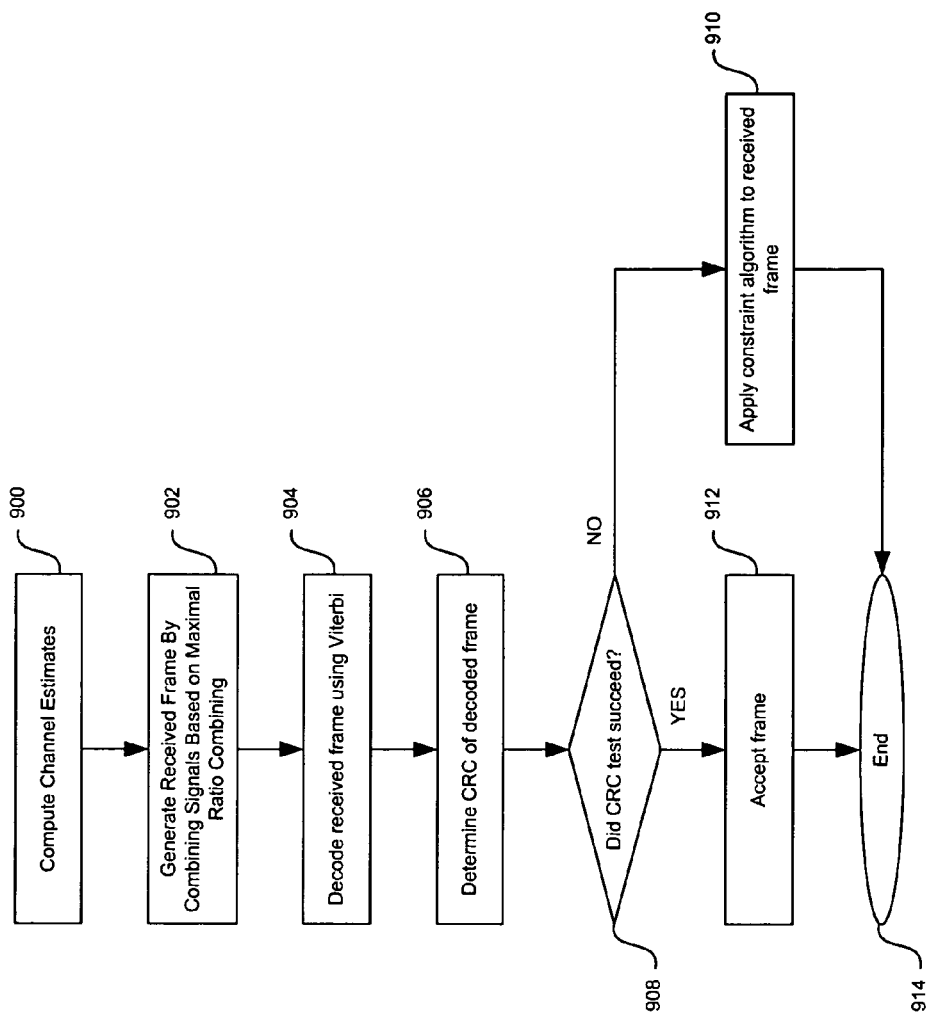
FIG. 9 is a flow diagram illustrating exemplary steps in the application of redundancy to a multilayer process, in accordance with an embodiment of the invention.

FIG. 9 is a flow diagram illustrating exemplary steps in the application of redundancy to a multilayer process, in accordance with an embodiment of the invention. Referring to FIG. 9, in step 900 channel estimates may be computed by a channel estimation block 360 (FIG. 3). In step 902, a receive frame may be generated by combining at least a portion of a plurality of individual path signals received at the demodulation and diversity processing block 232 (FIG. 2). The receive frame may comprise received (RX) encoded data. In step 904, the decoder 400 (FIG. 4A) may decode a received frame in the frame process block 406 by utilizing the Viterbi algorithm. In step 906, a redundancy verification parameter, such as the CRC, may be determined for the decoded frame. In step 908, the decoder 400 may determine whether the CRC verification test was successful. When the CRC verifies the decoded frame, the decoder 400 may proceed to step 912 where the decoded frame is accepted. After step 912, the decoder 400 may proceed to end step 914.

Returning to step 908, when the CRC verification test is not successful for the decoded frame, the decoder 400 may proceed to step 910. In step 910, the decoder 400 may perform a redundancy algorithm that may be utilized to provide a decoding performance that may result in equal or reduced decoding errors than those that may occur from utilizing the standard Viterbi algorithm. After step 910, the decoder 400 may proceed to end step 914.

Figure 10:
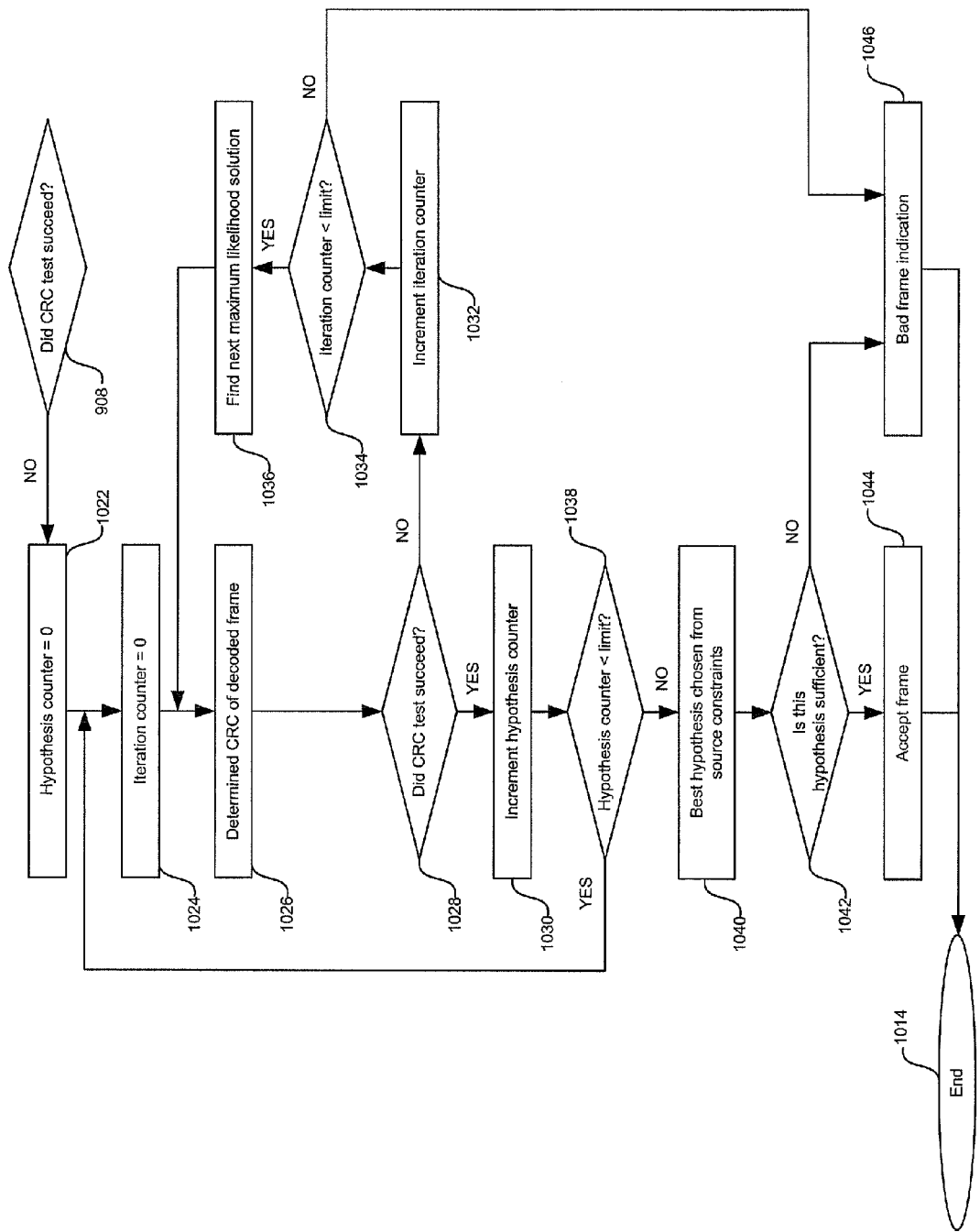
FIG. 10 is a flow diagram illustrating exemplary steps in the application of a constraint algorithm to a received frame, in accordance with an embodiment of the invention.

FIG. 10 is a flow diagram illustrating exemplary steps in the application of a constraint algorithm to a received frame, in accordance with an embodiment of the invention. Referring to FIG. 10, when the CRC verification test is not successful for the decoded frame in step 908 (FIG. 9), the decoder 400 (FIG. 4) may proceed to step 1022. In step 1022, a hypothesis counter may be set to an initial counter value to indicate a first hypothesis for consideration, for example. The initial counter value in step 1022 may be zero, for example. After step 1022, an iteration counter may be set to an initial counter value in step 1024 to indicate a first maximum likelihood solution, for example. The initial counter value in step 1024 may be zero, for example. In step 1026, the CRC of the decoded frame may be determined.

In step 1028, the decoder 400 may determine whether the CRC verification test was successful for the current hypothesis. When the CRC verification test is not successful, the operation may proceed to step 1032. In step 1032, the iteration counter may be incremented. After step 1032, in step 1034, the decoder 400 may determine whether the iteration counter is less than a predetermined limit. When the iteration counter is higher or equal to the predetermined limit, the operation may proceed to step 1046 where a bad frame indication is generated. When the iteration counter is less than the predetermined limit, the operation may proceed to step 1036 where a next maximum likelihood solution may be determined. After step 1036, the operation may proceed to step 1026 where the CRC of the decoded frame may be determined based on the maximum likelihood solution determined in step 1026.

Returning to step 1028, when the CRC verification test is successful, the operation may proceed to step 1030. In step 1030, the hypothesis counter may be incremented. After step 1030, in step 1038, the decoder 400 may determine whether the hypothesis counter is less than a predetermined limit. When the hypothesis counter is less than the predetermined limit, the operation may proceed to step 1024 where the iteration counter may be set to an initial value. When the hypothesis counter is equal to the predetermined limit, the operation may proceed to step 1040 where the best hypothesis may be chosen from the source constraints.

After step 1040, in step 1042, the decoder 400 may determine whether the best hypothesis chosen in step 1040 is sufficient to accept the decoded frame. When the chosen hypothesis is sufficient to accept the decoded frame, the operation may proceed to step 1044 where the decoded frame may be accepted. When the chosen hypothesis is not sufficient to accept the decoded frame, the operation may proceed to step 1046 where a bad frame indication is generated. After step 1044 or step 1046, the operation may proceed to end step 1014.

Figure 11:
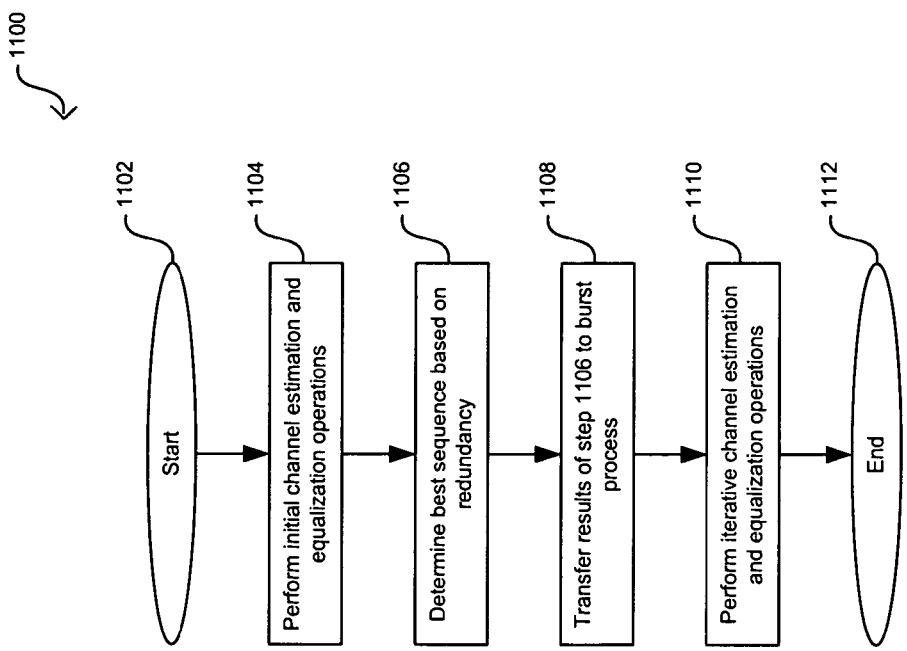
FIG. 11 is a flow diagram illustrating exemplary steps in the iterative multilayer approach for improving decoding, in accordance with an embodiment of the invention.

FIG. 11 is a flow diagram illustrating exemplary steps in the iterative multilayer approach for improving decoding, in accordance with an embodiment of the invention. Referring to FIG. 11, after start step 1102, in step 1104, an initial or first iteration of a channel estimation operation and of an equalization operation may be performed on received signals during a burst process portion of the multilayer decoding approach. The first iteration of the channel estimation operation and the first iteration of the equalization operation may be performed by, for example, the burst process block 402 in FIG. 4B. In step 1106, decoding of a received signal frame may be performed during the frame processing portion of the multilayer decoding approach. The frame processing may be performed by, for example, the frame process block 406 in FIG. 4B. In step 1108, at least a portion of the results generated in step 1106 by the frame process portion of the multilayer decoding approach may be transferred from, for example, the frame process block 406 to the burst process block 402 via a feedback signal. In step 1110, the burst processing may perform a second iteration of the channel estimation operation and a second iteration of the equalization operation based on the decoded results provided from the frame process portion of the multilayer decoding approach. After step 1110, the flow diagram 1100 may proceed to end step 1112. The improved results of the burst process may be further interleaved and processed by the frame process. The frame process may utilize a standard frame process or determine the best sequence that may be utilized based on, for example, redundancy.

Aspects of a system for an improved cellular diversity receiver may comprise a decoder 234 that enables generation of an initially decoded output bit sequence by a frame process for a received bit sequence for a plurality of received multipath signals. The frame process may utilize redundancy based decoding, which imposes at least one physical constraint during the decoding, which may be performed by a decoding algorithm. The decoder 234 may enable feedback of the initially decoded output bit sequence for processing by a burst process. A newly decoded output bit sequence may be generated by a subsequent frame process based on the burst process. The plurality of received multipath signals may comprise at least 3 individual path signals. A demodulation and diversity processing block 232 may enable combination of at least a portion of individual path signals in the plurality of multipath signals via maximal ratio combining (MRC) or equal gain combining (EGC). A base station 204, comprising at least one demodulation and diversity processing block 232 and/or decoder 234 may enable computation of at least one channel estimate for each of the individual path signals. At least one weighting factor may also be computed for each of the individual path signals. For EGC, for example, each of the weighting factors, corresponding to each of the individual path signals, may be about equal. For MRC, for example, a value for each of the weighting factors may be computed based on at least one signal energy lever for a corresponding one of the individual path signals. The individual path signals may be combined based on a corresponding at least one channel estimate, and a corresponding at least one weighting factor.

The decoder 234 may enable imposition of at least one physical constraint during decoding by a decoding algorithm in the first frame process. At least one physical constraint may also be imposed during decoding by a decoding algorithm in the second frame process. The one or more physical constraints may comprise one or more line spectral pair (LSP) sets, pitch delays, and/or pitch gains. The decoder 234 may enable generation of the newly decoded output bit sequence based on information from at least one previous frame. A channel estimation operation may be modified based on the fed back initially decoded output bit sequence.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for signal processing, the method comprising:
performing by one or more circuits and/or processors:
generating a first decoded output bit sequence utilizing a first decoding algorithm in a frame process, wherein said first decoded output bit sequence is generated from a received bit sequence for a plurality of received multipath signals;
when said first decoded output bit sequence fails verification, generating by said frame process, a second decoded output bit sequence from said received bit sequence for said plurality of received multipath signals utilizing a second decoding algorithm, wherein said second decoding algorithm comprises a redundancy-based decoding that imposes at least one physical constraint;
feeding back information decoded in said frame process; and
processing the information by a burst process that comprises decoding one or more groups of encoded bits included within a frame, wherein the burst process includes a first burst process iteration and a second burst process iteration, and the second burst process iteration is based on using a gradient search approach to determine a minimal distance H between a received signal and an estimate signal.

2. The method according to claim 1, comprising combining via one or both of a maximal ratio combining and an equal gain combining, at least a portion of individual path signals in said plurality of received multipath signals.

3. The method according to claim 2, comprising computing at least one channel estimate for each of said individual path signals.

4. The method according to claim 3, comprising computing at least one weighting factor for each of said individual path signals.

5. The method according to claim 4, wherein a value for each of said at least one weighting factor, corresponding to said each of said individual path signals, is equal.

6. The method according to claim 4, comprising computing a value for said at least one weighting factor based on at least one signal energy level for a corresponding one of said individual path signals.

7. The method according to claim 4, wherein said combining is based on said individual path signals, a corresponding said at least one channel estimate, and a corresponding said at least one weighting factor.

8. The method according to claim 1, wherein said plurality of received multipath signals comprises at least 3 individual path signals.

9. The method according to claim 1, wherein said frame process is a first frame process, the method comprising imposing at least one physical constraint during decoding by said second decoding algorithm in said first frame process.

10. The method according to claim 9, wherein a subsequent frame process through a feedback operation is a second frame process, the method comprising imposing said at least one physical constraint during decoding by said second decoding algorithm in said second frame process.

11. The method according to claim 1, wherein said at least one physical constraint comprises one or more of a line spectral pair (LSP) set, a pitch delay, and a pitch gain.

12. The method according to claim 1, comprising generating a newly decoded output bit sequence based on information from at least a previous frame.

13. The method according to claim 1, comprising modifying a channel estimation operation based on said second decoded output bit sequence.

14. The method according to claim 1, wherein said feeding back includes using said second decoded output bit sequence for processing by said burst process.

15. The method according to claim 14, further comprising generating a newly decoded output bit sequence by a subsequent frame process based on said burst process.

16. A system for signal processing, the system comprising:
one or more circuits that are configured to generate a first decoded output bit sequence utilizing a first decoding algorithm in a frame process, wherein said first decoded output bit sequence is generated from a received bit sequence for a plurality of received multipath signals;
when said first decoded output bit sequence fails verification, said one or more circuits are configured to generate by said frame process, a second decoded output bit sequence for said received bit sequence for said plurality of received multipath signals utilizing a second decoding algorithm, wherein said second decoding algorithm comprises a redundancy-based decoding that imposes at least one physical constraint; and
said one or more circuits are further configured to feed back information decoded in said frame process and to process the information by a burst process that comprises decoding one or more groups of encoded bits included within a frame, wherein the burst process includes a first burst process iteration and a second burst process iteration, and the second burst process iteration is based on using a gradient search approach to determine a minimal distance H between a received signal and an estimate signal.

17. The system according to claim 16, wherein said one or more circuits are configured to combine via one or both of a maximal ratio combining and an equal gain combining, at least a portion of individual path signals in said plurality of received multipath signals.

18. The system according to claim 17, wherein said one or more circuits are configured to compute at least one channel estimate for each of said individual path signals.

19. The system according to claim 18, wherein said one or more circuits are configured to compute at least one weighting factor for each of said individual path signals.

20. The system according to claim 19, wherein a value for each of said at least one weighting factor, corresponding to said each of said individual path signals, is equal.

21. The system according to claim 19, wherein said one or more circuits are configured to compute a value for said at least one weighting factor based on at least one signal energy level for a corresponding one of said individual path signals.

22. The system according to claim 19, wherein said combining is based on said individual path signals, a corresponding said at least one channel estimate, and a corresponding said at least one weighting factor.

23. The system according to claim 16, wherein said plurality of received multipath signals comprises at least 3 individual path signals.

24. The system according to claim 16, wherein:
said frame process is a first frame process; and
said one or more circuits are configured to impose said at least one physical constraint during decoding by said second decoding algorithm in said first frame process.

25. The system according to claim 24, wherein:
a subsequent frame process through a feedback operation is a second frame process; and
said one or more circuits are configured to impose said at least one physical constraint during decoding by said second decoding algorithm in said second frame process.

26. The system according to claim 16, wherein said at least one physical constraint comprises one or more of a line spectral pair (LSP) set, a pitch delay, and a pitch gain.

27. The system according to claim 16, wherein said one or more circuits are configured to generate a newly decoded output bit sequence based on information from at least a previous frame.

28. The system according to claim 16, wherein said one or more circuits are configured to modify a channel estimation operation based on said second decoded output bit sequence.

29. The system according to claim 16, wherein said one or more circuits that are configured to feed back information decoded in said frame process include being configured to feed back said second decoded output bit sequence for processing by said burst process.

30. The system according to claim 29, wherein said one or more circuits are further configured to generate a newly decoded output bit sequence by a subsequent frame process based on said burst process.

* * * * *